United States Patent [19]

Kojima et al.

[11] Patent Number: 4,653,982
[45] Date of Patent: Mar. 31, 1987

[54] WINDMILL WITH CONTROLLER FOR CONTROLLING ROTOR RPM

[75] Inventors: Noboru Kojima; Kinya Kitagawa, both of Iwata, Japan

[73] Assignee: Yamaha Hatsudoki Kabushiki Kaisha, Iwata, Japan

[21] Appl. No.: 595,747

[22] Filed: Mar. 30, 1984

[30] Foreign Application Priority Data

Apr. 1, 1983 [JP] Japan .................. 58-56527

[51] Int. Cl.⁴ .................. F03D 7/04
[52] U.S. Cl. .................. 416/44; 416/3; 416/46; 416/52
[58] Field of Search ........... 416/11, 41 A, 43 A, 416/44 A, 50 A, 51 A, 52 A, 3, 139 A, 51 R, 46; 200/61.45 M; 73/535, 536, 537, 538, 539, 512, 550

[56] References Cited

U.S. PATENT DOCUMENTS

| | | | |
|---|---|---|---|
| 1,397,713 | 11/1921 | Anderson | 416/51 A X |
| 1,482,690 | 2/1924 | Lanzius | 416/51 A |
| 1,782,280 | 11/1930 | Willenbring | 416/51 A |
| 1,855,220 | 4/1932 | Buchser | 416/51 A |
| 1,941,611 | 1/1934 | Manikowske | 416/51 A X |
| 2,086,686 | 7/1937 | Weible | 416/51 A |
| 2,294,867 | 9/1942 | Bottrill | 416/51 R |
| 2,391,778 | 12/1945 | Gregor | 416/51 R |
| 2,615,704 | 10/1952 | Vacha | 73/537 |
| 2,677,539 | 5/1954 | Winslow | 73/538 X |
| 2,685,932 | 8/1954 | Hartel | 416/139 |
| 2,703,831 | 3/1955 | Covington | 73/538 X |
| 2,957,351 | 10/1960 | Heintzmann | 73/537 |
| 3,395,761 | 8/1968 | Holzer | 416/3 X |
| 3,603,751 | 9/1971 | Smith | 416/3 X |
| 3,715,171 | 2/1983 | Kettner | 416/3 X |
| 3,891,347 | 6/1975 | Jacobs et al. | 416/44 A X |
| 4,257,736 | 3/1981 | Jacobs | 416/139 A X |
| 4,363,241 | 12/1982 | Egolf | 73/536 |
| 4,374,631 | 2/1983 | Barnes | 416/44 A X |
| 4,431,375 | 2/1984 | Carter et al. | 416/11 X |
| 4,495,423 | 1/1985 | Rogers | 416/43 A X |

FOREIGN PATENT DOCUMENTS

| | | | |
|---|---|---|---|
| 63740 | 7/1945 | Denmark | 416/137 |
| 453743 | 12/1927 | Fed. Rep. of Germany | 416/139 A |
| 2401331 | 4/1979 | France | 416/139 A |
| 2413566 | 8/1979 | France | 416/11 |
| 1341604 | 12/1973 | United Kingdom | 416/51 R |
| 2096250 | 10/1982 | United Kingdom | 416/51 A |

Primary Examiner—Everette A. Powell, Jr.
Attorney, Agent, or Firm—Ernest A. Beutler

[57] ABSTRACT

A windmill construction embodying an improved arrangement for driving a load through a centrifugal clutch and for adjusting the pitch angle of the blades. The adjusting mechanism is responsive to speed so as to increase the pitch angle as the speed increases and further incorporates a latch mechanism for latching the blades in a maximum feathering pitch angle and for introducing a hysteresis effect into the mechanism.

7 Claims, 4 Drawing Figures

WINDMILL WITH CONTROLLER FOR CONTROLLING ROTOR RPM

BACKGROUND OF THE INVENTION

This invention relates to a windmill with a controller for controlling rotor rpm and more particularly to an improved governor and method of governing.

With the increased emphasis on energy conservation, there is an increased interest in the use of windmills as power sources. Windmills may be used to provide electrical or mechanical energy from wind power by driving either generators or mechanical devices such as pumps or the like. However, the speed of rotation of the windmill is generally directly related to the wind velocity and unless some governing mechanism is provided, the driven element may be damaged due to high wind forces and high rotational speeds. Although it has been proposed to provide a mechanism for governing the speeds, these mechanisms tend to become complicated and also compromise the design of the windmill.

For example, it has been proposed to provide a governing mechanism in which the pitch angle of the blades of the windmill are changed to control rotor speed. Normally, electrical or hydraulic devices have been employed for changing the pitch angles. However, such pitch angle changing devices themselves consume power and thus reduce the effectiveness of the windill. In addition, it has been the previous practice to position the governor on the output side of the windill in proximity to the driven load. Therefore, it is necessary to provide a complicated mechanism for transmitting the signal from the speed sensor to the blade angle changing mechanism. Not only does this complicate the structure, but it compromises the design of the windmill per se.

It is, therefore, a principal object of this invention to provide an improved method and structure for controlling the pitch angle of the blades of a windmill.

It is a further object of this invention to provide an improved and simplified pitch angle adjusting governor for a windmill that can be located directly at the blades.

It is a yet further object of this invention to provide a pitch angle adjusting device that will incorporate hysteresis.

It is a further object of this invention to provide a governing method for the blades of a windmill that permits the blades to be mounted in a tilting or see-saw fashion so as to improve the performance of the windmill and to minimize the likelihood of damage under shifting wind conditions.

In addition to controlling the pitch angle of the blades of a windmill, there are many other instances where governors are employed. However, governors of the type previously proposed for many applications have not been successfully able to incorporate a hysteresis action, which is desirable in many governor type mechanisms.

It is, therefore, a still further object of this invention to provide a governor of an improved construction which will provide a hysteresis effect.

SUMMARY OF THE INVENTION

A first feature of this invention is adapted to be embodied in a windmill or the like having at least one blade that is supported for rotation about a rotational axis and which is supported for pitch adjustment about a pitch axis. In accordance with this feature of the invention, a controller is provided for controlling the speed of rotation of the blade about the rotational axis comprising an inertial member supported for rotation with the blade and about a rotational axis and for radial movement relative to its rotational axis to a position determined by the rotational speed. Means are provided for coupling the inertial member with the blade for adjusting the angular position of the blade about its pitch axis in relation to the radial position of the intertial member about its rotational axis. Biasing means provide a yielding resistance to radial movement of the intertial member. Latch means are also provided for releasably restraining the blade in a predetermined pitch angle until the difference between the centrifugal forces on the interial member and the force of the biasing means on the interial member exceeds a predetermined value.

Another feature of the invention is adapted to be embodied also in a controlling device for controlling the pitch of a blade of a windmill. In accordance with this feature of the invention, means are provided for increasing the pitch angle of the blade from a first angle to a second, larger angle progressively as the speed of the blade increases from a first speed to a second speed. Means are also provided for holding the blade at the second pitch angle when the speed of rotation of the blade falls below the second speed until it reaches a decreased speed of predetermined value.

Another feature of this invention is adapted to be embodied in a method for controlling the pitch angle of a blade. In accordance with this method, the pitch angle of the blade is progressively increased from a first angle to a second larger pitch angle as the speed of the blade increases from a first speed to a second speed. Also in accordance with this method, the blade is held at the second pitch angle when the speed of rotation of the blade falls below the second speed until a decreased predetermined speed is reached.

A yet further feature of this invention is adapted to be embodied in a controller for controlling rotational speed. Such a controller includes an inertial member that is supported for rotation about a rotational axis and for radial movement relative to the rotational axis to a position determined by its rotational speed. Biasing means are effective to yieldably resist radial movement of the inertial member and latch means are provided for releasably restraining the inertial member in a predetermined radial position until the difference between the centrifugal force on the inertial member and the force of the biasing means on the inertial member exceeds a predetermined value.

DETAILED DESCRIPTION OF THE PREFERRED EMBODIMENT

Figure 1:
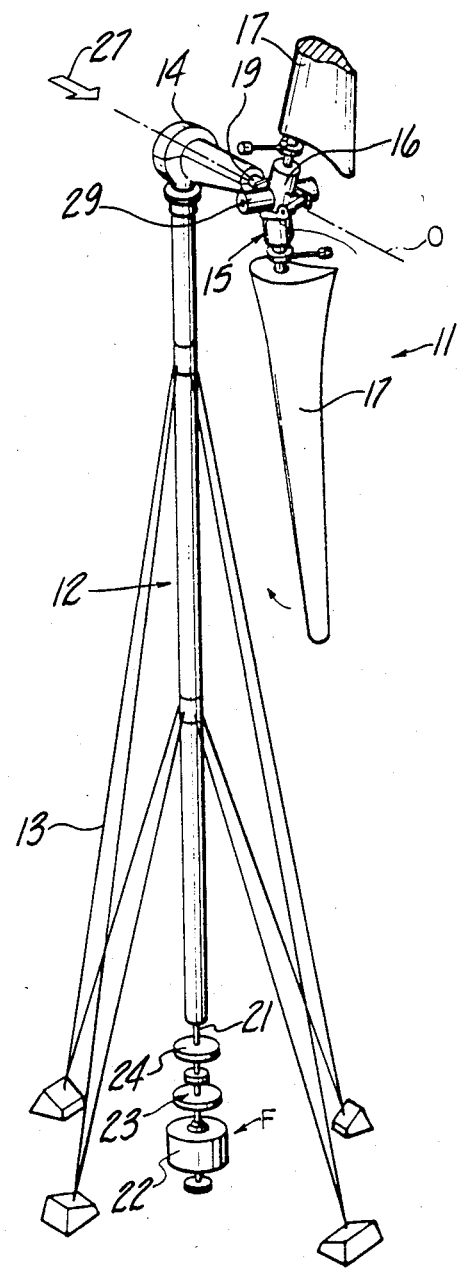
FIG. 1 is a perspective view of a windmill constructed in accordance with a preferred embodiment of the invention.

Referring first to FIG. 1, a windmill constructed in accordance with an embodiment of the invention is identified generally by the reference numeral 11. The windmill 11 includes a tower 12 that is supported to extend in a vertical direction in a known manner, by means including guide wires 13. A nacel 14 is journaled at the top of the tower 12 for rotation about a vertically extending axis defined by the tower 12. The nacel 14, in turn, rotatably journals a rotor hub 15 for rotation about a generally horizontally disposed axis O. The hub 15 has blade mounting portions 16 in which blades 17 are supported in a manner to be described. The blades 17 rotate with the hub 15 about the rotational axis O. In addition, the blades 17 are supported for rotation so that their pitch can be changed about a pitch axis, as to be described.

The hub 15 is connected by means of a supporting member 18 to a shaft 19 which is, in turn, journaled within the nacel 14. The shaft 19 contains at its inner end a bevel gear that meshes with a bevel gear carried at the upper end of an output shaft 21 that is journaled in the tower 12 in a known manner and which extends to the lower end of the tower 12 where it drives a load, indicated generally by the character F.

The load F includes an output member 22 which may be an electrical generator such as an alternator, synchronous generator or induction generator or a mechanical device such as a pump for a heat pump or the like. The shaft 21 drives the output member 22 through a centrifugal clutch 23, for a reason to be described. In addition, a brake 24 may be provided on the shaft 21 for holding it against rotation, if desired.

Figure 2:
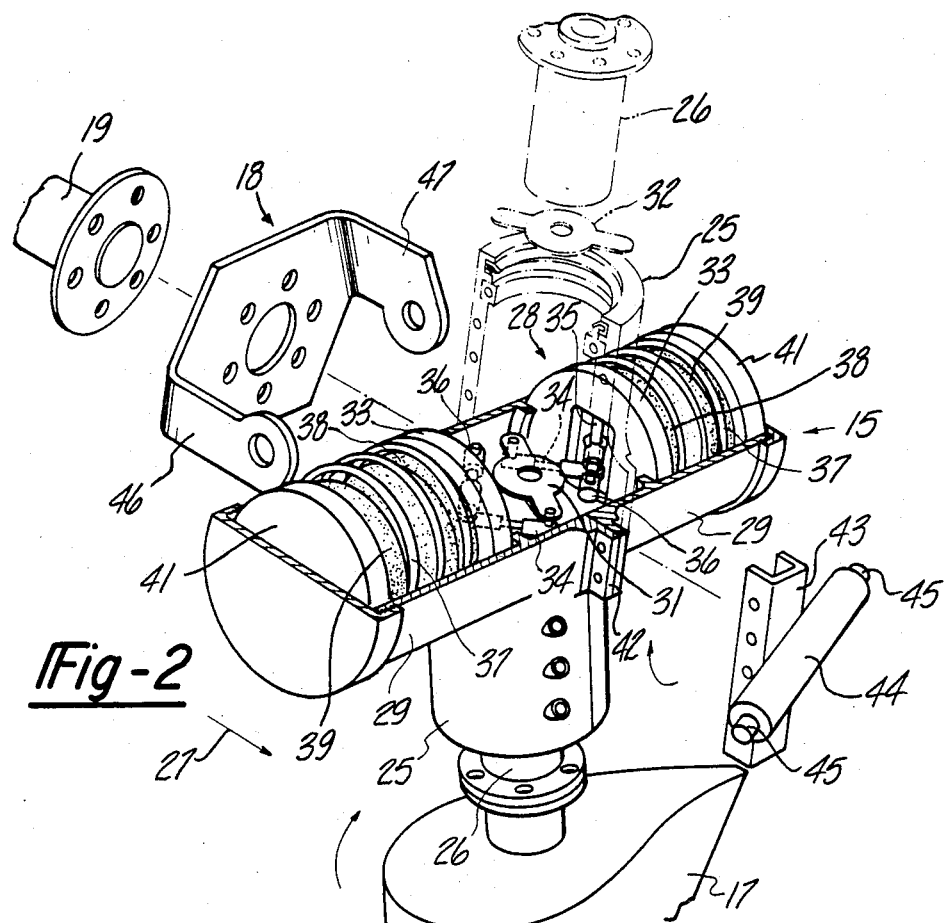
FIG. 2 is an enlarged, perspective view showing the hub construction of the windmill, with portions broken away and other portions shown in phantom.
Figure 3:
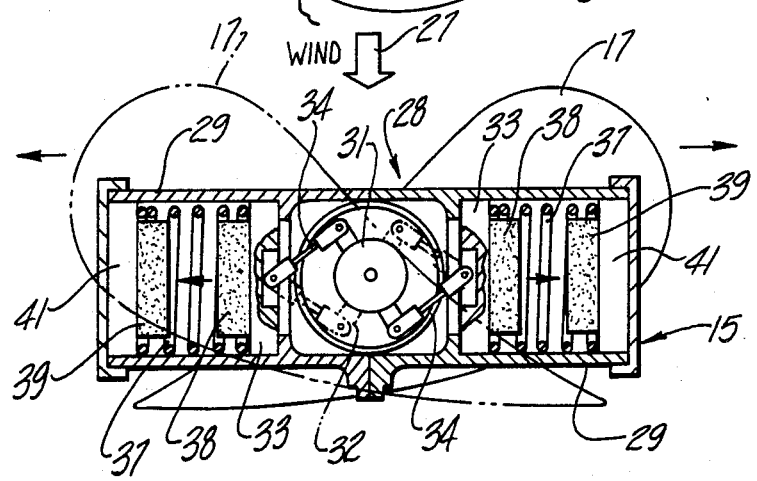
FIG. 3 is a cross-sectional view taken through the center of the speed controlling mechanism along a horizontal plane.

Referring now additionally to FIGS. 2 and 3, the mounting and control arrangement for the blades 17 will be described. The hub 15 is a cruciform shaped member having a pair of oppositely extending blade journaling arms 25. The arms 25 journal blade shafts 26 that are affixed to the inner ends of each of the blades 17. The shafts 26 and blades 17 are supported for rotational movement about respective axes that are inclined at an angle α with respect to the direction of air flow as indicated by the arrows 27 in the various figures. This angular disposition is provided so as to permit free rotation of the nacel 14 about the vertically extending axis upon shifts in wind direction so that the blades 17 will always be facing directly into the wind direction 27. This obviously increases efficiency.

The shafts 26 and blades 17 are journaled for rotation about an axis which may be considered to be the pitch axis so as to change the angle of attack of the blades 17 under the control of a controller assembly, indicated generally by the reference numeral 28. The controller assembly 28, which comprises a governor type of mechanism, as will become apparent, is contained within cross arms 29 of the hub 15. The cross arms 29 are disposed at substantially right angles to the arms 25, however, the arms 29 extend perpendicularly to the axis of the rotation of the shaft 19 rather than at the angle α as the arms 25.

The arms 29 and the central portion of the hub 15 is generally hollow and supports a pair of bellcranks 31 and 32, each of which is associated with a respective one of the blades 17 and specifically its shaft 26. The bellcrank 31 is assocated with the lowermost blade as viewed in FIG. 2 and is non-rotatably affixed to the shaft 26 of this blade in a suitable manner. In a like manner, the bellcrank 32 is affixed for rotation with the shaft 27 of the remaining blade 17 in a suitable manner. The angular position of the bellcranks 31 and 32 and, accordingly, the angular position of the shafts 26 and blades 17 about the pitch axis is controlled by an inertial control mechanism now to be described.

The inertial control mechanism comprises a pair of inertial masses 33, each of which is cylindrical in shape and which is slidably supported in a bore formed in a respective one of the arms 29. Each inertial mass is connected to the arms of the bellcrank 31 by means of a respective link 34. Each link 34 has one end pivotally connected to the respective mass 33 by means of a pivot pin 35. The opposite end of each link 34 is connected to an arm of the bellcrank 31 by means of a pivot pin. Hence, reciprocation or radial movement of the inertial members 33 will effect rotation of the bellcrank 31 and, accordingly, rotation of the blades 17 about their respective pitch axes.

In a similar manner, the inertial members 33 are connected by links 36 to the arms of the bellcrank 32. One end of each of the links 36 is pivotally connected to the respective inertial mass 33 by means of the pins 19. The opposite ends of the links 36 are pivotally connected to the arms of the bellcrank 33. It should be noted that the links 34 and 36 extend in opposite directions so that movement of the inertial masses 33 will effect rotation of the blades 17 in opposite senses about their respective pitch axes.

As the speed of rotation of the hub 15 increases, the inertial masses 33 will tend to move radially outwardly with respect to the axis of rotation and change the pitch angle of the blades 17. Biasing springs 37 are contained within the bores that support each of the inertial masses 33 and which yieldably resist this radial movement. In addition, the springs 37 are preloaded so that a predetermined rotational speed must be exceeded before the inertial members 33 will undergo their radial movement.

A latching mechanism is also provided for locking the blades 17 in a predetermined pitch position, preferably a feathering position, when the speed of the rotation of the hub 15 exceeds a predetermined speed and until the speed falls below a speed substantially lower than that predetermined speed. This latching mechanism, therefore, introduces a hysteresis effect into the controller 28.

In accordance with an embodiment of the invention, this latching mechanism comprises a permanent magnet 38 that is affixed to each of the inertial masses 33 and which itself will form a portion of the inertial mass. The permanent magnets 38 are adapted to cooperate with fixed permanent magnets 39 that are carried by end closure plugs 41 formed at the outer periphery of the bores in which the inertial masses 33 are supported. When the radial movement of the inertial masses 33 is sufficient to bring the permanent magnets 38 and 39 into proximity with each other so as to be locked magnetically together, the blades 17 will be locked in the predetermined pitch angle, as will be described in conjunction with the description of the operation.

The manner of connecting the hub 15 to the mounting bracket 17 will now be described. The hub has a forwardly extending flange 42 that is encircled by a bracket 43 which is, in turn, affixed to the flange 42 by means of suitable fasteners. The bracket 43 has affixed to it a cross-shaft 44 that has opposite ends 45 that are journaled in bearing portions formed in a pair of forwardly extending arms 46 and 47 of the bracket 18. The arm 46 extends beneath the adjacent hub arm 29 while the arms 47 extends above its adjacent hub arm as clearly shown in FIG. 1. Thus, the hub 15 may rock or see-saw relative to the bracket 18 by pivotal movement of the cross shaft 44 in the bearings afforded by the arms 46 and 47. This has been found to afford stability to the device under varying wind conditions.

OPERATION AND THEORY

Figure 4:
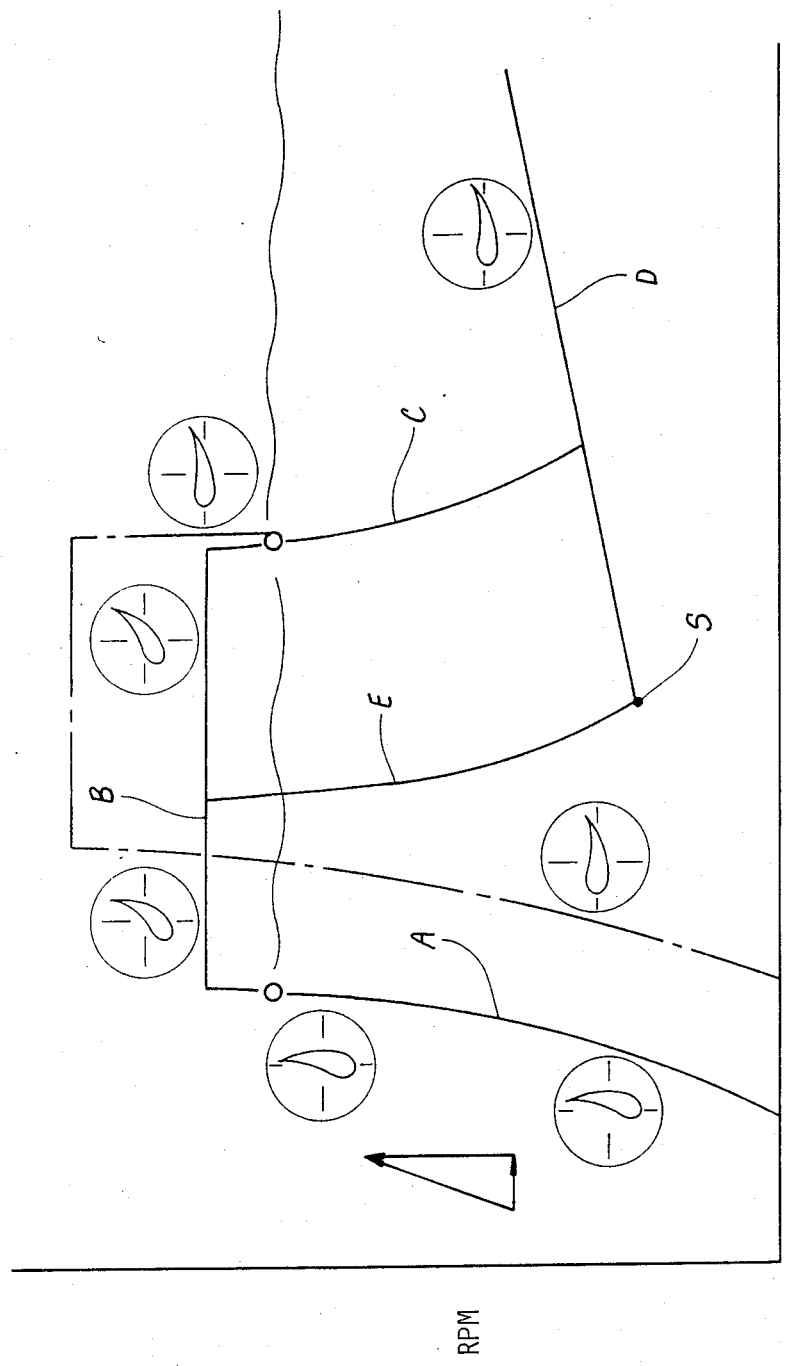
FIG. 4 is a graphical analysis showing the relationship between wind speed, rotor speed, output speed and blade pitch angle in accordance with the invention.

FIG. 4 is a graphical analysis that shows wind velocity on the abscissa and speed of rotation on the ordinate. In addition, the angular position or pitch of the blades 17 is also shown in this figure for certain speed and wind velocity characteristics. The solid line curve indicates the speed of rotation of the propeller hub 15 about the axis defined by the shaft 19. The dot-dash curve shows the relationship of the output of the load 22 to the rotational speed and other factors illustrated in this curve.

Assuming the condition of low or no air speed, the springs 37 will hold the inertial masses 33 in their radially inward position and the blades 17 will be held so that they have a maximum angle of attack with respect to the wind direction. As has been previously noted, the rotatable support of the nacel 14 about the vertically extending axis defined by the tower 12 and the offset of the axis of the blade shafts 26 to the direction of wind will cause the blades 17 to always face direct into the wind.

As the wind velocity increases, it will eventually reach a point at which the blades 17 will begin to rotate. As the blades begin their rotation, the speed at which the shaft 21 is initially driven will not be sufficient so as to cause the centrifugal clutch 23 to engage. Therefore, the blades 17 and hub 15 may freely accelerate in response to the wind velocity without the drag of the load 22. During this condition, and until a predetermined speed is reached, as shown by the curve portion A, the springs 37 will hold the blades 17 at their maximum angle of attach and there will be no adjustment of the pitch angle of the blades 17.

When the velocity of the shaft 21 reaches the predetermined speed necessary to cause the centrifugal clutch to become engaged, the load 22 will begin to be driven as shown by the dot-dash line in FIG. 4. This speed is set high enough so as to not interfere with the rapid acceleration of the shaft 21 under low wind conditions.

As the speed of rotation of the shaft 19 and specifically the hub 15 increases, eventually the centrifugal force on the inertial masses 33 will become sufficient to overcome the action of the biasing springs 37. This is the condition shown by the curve portion B in FIG. 4. When this occurs, the inertial masses 35 will move radially outwardly and cause the angle of pitch of the shafts 26 and blades 17 to gradually decrease so that the speed of rotation of the hub 15 will be maintained substantially constant even under conditions of increased wind velocity.

If the wind velocity continues to increase to a dangerous level, the inertial masses 33 will have moved sufficiently outwardly so that the permanent magnets 38 and 39 come into proximity with each other. When this occurs, the magnets 38 and 39 will latch to each other and hold the blades 17 in a condition wherein they extend in a direction to the direction of wind flow so as to place them in a feathering condition as shown by the curved portion C. The curve portion D shows the relationship between wind velocity and speed under the feathering state. It will be noted that even though the wind velocity increased markedly, the rotor speed will not increase significantly and will be maintained below the maximum speed level. The blades will be held in this condition until the speed drops sufficiently so that the force of the spring 37 overcomes the combined force of the attraction of the permanent magnets 38 and 39 and the centrifugal force on the inertial masses 33. That is, the magnets 38 and 39 have an attractive force which must be exceeded by the difference between the load of the spring 37 and the inertial force of the magnets 33 before the magnets 38 and 39 can be released and the blades 17 released from their feathering condition.

If the wind velocity decreases, the speed of the rotor will eventually decrease until the centrifugal force and attraction of the magnets is sufficient to overcome the action of the springs 37. This occurs when the curve portion D intersects the curve portion E and the springs will then overcome the action of the magnets 38 and 39 and the blades 17 will be released from their feathering condition. The actual angle to which the blades will return will depend upon the actual speed of rotation, but in the illustrated embodiment, the blades will be returned to their maximum position and the rotor and hub 15 will again accelerate and follow the curve E. Thus, it should be readily apparent that the latching action provided for by the magnets 38 and 39 introduces a hysteresis into the system so as to afford good protection and maximum power output of the load 22 under substantially all wind conditions without creating an overloading relationship.

Although the invention has been described in conjunction with a governor controller for the pitch of the blades of a windmill, it should be readily apparent that the controller device may be used in other governing operations where a hysteresis effect may be desired. For example, the governor can be used to control the speed of an engine by controlling the fuel flow to the engine in response to the centrifugal forces of the inertial members 33 along with the operation of the springs 37 and permanent magnets 38 and 39. Various other applications for the invention and specifically the hysteresal effect will present themselves to those skilled in the art.

It should be readily apparent that the construction is extremely simple and may be contained within the hub structure of the propeller itself. Therefore, a very simple arrangement can be used and the propeller arrangement may be mounted so that it can go through the pivotal movement and readily adjust itself to changes in wind direction as was not possible with devices wherein the governor mechanism was controlled by the output shaft 21. Furthermore, the governor mechanism is such that it does not take any load to drive and, therefore, the maximum output of the device 22 may be effected. Although the invention has been described in connection with the use of the centrifugal clutch 23, in some instances the clutch 23 may not be necessary. Although an embodiment of the invention has been illustrated and other applications described, it should be readily apparent that various changes and modifications may be made, without departing from the spirit and scope of the invention, as defined by the appended claims.

We claim:

1. In a windmill or the like having at least one blade supported for rotation about a rotatonal axis and supported for pitch adjustment relative to a hub about a pitch axis, an improved controller for controlling the speed of rotation about said rotational axis comprising an inertial member supported for rotation with said blade about an inertial member rotational axis and for increased radial movement relative to said inertial member rotational axis in response to increased rotational speed, means for coupling said inertial member with said blade for increasing the pitch angles of said blade about said pitch axis to an increased radial position of said inertial member about its rotational axis, biasing means for yieldably resisting radial movement of said inertial member, and latch means for releasably retaining said blade in a predetermined increased pitch angle until the speed of said inertial member falls below a predetermined value, said latch means comprising a pair of cooperating magnetic members at least one of which is permanently magnetized offering no resistance to the movement of said inertial member to its position corresponding to said predetermined position of said blade, one of said cooperating magnetic members being fixed to said inertial members and the other of said cooperating magnetic members being fixed relative to said hub.

2. In a windmill as set forth in claim 1 wherein the increased pitch angle of the blade is a feathering condition.

3. In a windmill as set forth in claim 1 further including a load driven by the blade and a centrifugal clutch interposed between the blade and the said load for preventing driving of the load until the speed of said blade exceeds a predetermined value.

4. In a windmill as set forth in claim 1 further including a second blade adjustably supported and controlled by the inertial member, said first and said second blades being supported by a hub that is pivotally supported for rocking movement relative to the rotational axis of the blades.

5. In a windmill as set forth in claim 4 wherein the increased pitch angle of the blades is a feathering condition.

6. In a windmill having at least one blade supported for rotation about a rotational axis and supported for pitch adjustment about a pitch axis, an improved controller for controlling the speed of rotation about said rotational axis comprising an inertial member supported for rotation with said blade about an inertial member rotational axis and for radial movement relative to said inertial member rotational axis to a position determined by the rotational speed, means for coupling said inertial member with said blade for adjusting the angular position of said blade about said pitch axis relative to the radial position of said rotational member about its rotational axis, biasing means for yieldably resisting radial movement of said inertial member, and latch means for releasably retaining said blade in a predetermined pitch angle until the difference between the centrifugal force on said inertial member and the force of said biasing means on said inertial member exceeds a predetermined value, said blade being supported for rotation by a hub member having a first arm rotatably supporting said blade and a second arm supporting said inertial member for rotation about the same rotational axis as said blade and for radial movement in a direction perpendicular to the rotational axis, said inertial member being cylindrical in shape and supported within a bore in said second arm, said biasing means comprising a coil spring contained within said bore and urging said inertial member to a retracted position, the latch means comprising a permanent magnet affixed to said inertial member and a cooperating permanent magnet supported within said hub member at a predetermined radial position with respect to said inertial member for locking said inertial member in an extended position.

7. In a windmill as set forth in claim 1 wherein said magnetic members have sufficient attraction effective to accelerate the movement of said inertial member into its predetermined position.

* * * * *